US006633990B1

(12) United States Patent
Eisenberg (10) Patent No.: US 6,633,990 B1
(45) Date of Patent: Oct. 14, 2003

(54) TIME SCHEDULING METHOD AND SCHEDULER FOR A MODULAR ENGINE THAT NEGOTIATES AMONG MODULES TIMING OFFERS WHICH INCLUDE A TIMING RANGE

(75) Inventor: Rolf Eisenberg, Venlo (NL)

(73) Assignee: Océ-Technologies B.V., Venlo (NL)

( * ) Notice: Subject to any disclaimer, the term of this patent is extended or adjusted under 35 U.S.C. 154(b) by 0 days.

(21) Appl. No.: 09/525,947

(22) Filed: Mar. 15, 2000

(30) Foreign Application Priority Data

Mar. 15, 1999 (EP) ............................................. 99200789

(51) Int. Cl.[7] .......................... G06F 1/04; G05B 19/042
(52) U.S. Cl. .......................... 713/400; 706/10; 355/133
(58) Field of Search .................. 355/133; 358/1.15, 358/296; 399/75; 706/10; 713/400

(56) References Cited

U.S. PATENT DOCUMENTS

| 4,737,907 A | | 4/1988 | Federico et al. ............. 709/400 |
| 5,606,695 A | * | 2/1997 | Dworzecki ...................... 705/8 |
| 5,682,247 A | * | 10/1997 | Webster et al. ............. 358/296 |
| 6,097,500 A | * | 8/2000 | Fromherz ..................... 358/1.8 |
| 6,182,055 B1 | * | 1/2001 | Kase et al. ................... 706/10 |

FOREIGN PATENT DOCUMENTS

| EP | A20376738 | | 7/1990 | |
| EP | 0747793 A2 | | 12/1996 | |
| JP | 200267705 A | * | 9/2000 | ........... G05B/19/05 |

OTHER PUBLICATIONS

Carlos Ramos, "A Holonic Approach for Task Scheduling in Manufacturing Systems", Proceedings of the 1996 IEEE International Conference on Robotics and Automation.*

Duncan C. McFarlane, "Holonic Manufacturing Systems in Continuous Processing: Concepts and Control Requirements", Proceedings of ASI' 95.*

Lathon RD et al: Processings of the International Conference on Systems, Man, and Cybernetics, San Antonio, Oct. 2–5, 1994, vol. 2, Oct. 2, 1994, pp. 1541–1546 XP000531260.

Leuth TC et al: Proceesings of the IEEE/RSJ/GI International Conference on Intellig Robots and Systems: Advanced Robotics and the Real World, Munich, Sep. 12–16, 1994, vol. 3, Sep. 12, 1994, pp. 1516–1523, XP0005150598.

* cited by examiner

*Primary Examiner*—Jeffrey Gaffin
*Assistant Examiner*—Albert Wang
(74) *Attorney, Agent, or Firm*—Birch, Stewart, Kolasch & Birch, LLP (57) ABSTRACT

Disclosed are a time scheduling method and scheduler for a modular engine, e.g. a sheet handling engine. Interaction between the modules (e.g., 12, 14, 16, 18) of the engine involves an output from one module being delivered as an input to another module. The engine has at least one module (e.g., 12) that does not need an input from another module for performing a first action. The method comprises the allocation of a time to each action to be performed by the modules on the basis of information on the current status and timing constraints of the respective modules, wherein each module allocates the timings for its own actions by sending a timing offer (e.g., F[OK, . . . , . . . ]) to the module to which the output has to be delivered and receiving from that module a message (e.g., B[OK, . . . ]; B[NOT OK, . . . ]) accepting or rejecting the offer. The timing offer is based on the internal status and timing constraints of the module itself and, if an input from another is needed, on a timing offer from that module.

11 Claims, 7 Drawing Sheets

Fig. 10

TIME SCHEDULING METHOD AND SCHEDULER FOR A MODULAR ENGINE THAT NEGOTIATES AMONG MODULES TIMING OFFERS WHICH INCLUDE A TIMING RANGE

FIELD OF THE INVENTION

The invention relates to a time scheduling method for a modular engine, and more particularly to such an engine including a set of action modules each for performing a particular action, wherein, for a chain of actions to be scheduled, interaction between the modules involved in the chain of actions comprises an output from one module being delivered as an input to another module, the engine comprising at least one module that does not need an input from another module for performing a first action, the engine performing a method comprising the allocation of a time to each action to be performed by the modules on the basis of information on the current status and timing constraints of the respective modules. The invention also relates to a scheduler employing this method and to a sheet handling machine, e.g. a copier, scanner or printer including such a scheduler.

BACKGROUND OF THE INVENTION

In a modular engine it is necessary to coordinate the functions of the various modules by establishing a time schedule according to which the various actions of the modules are to be performed.

U.S. Pat. No. 4,737,907 discloses a multiprocessor control system for a xerographic machine having a modular architecture. Each module is controlled by its own processor, and coordination of the various functions is achieved by a master processor communicating with the control processors of the modules via a bus system. Synchronizing signals, among others a machine clock signal, can be applied to the various processors independently from the bus system. Thus, it is possible for the master processor to download instructions to the control processors of the modules, such instructions specifying the action to be performed, an event by which the action is triggered, and a delay time between the triggering event and the moment at which the action has to be performed.

This has the advantage that the control processor of the module can autonomously monitor the triggering event and execute the required action at the correct timing, so that the burden on the master processor and the bus system is reduced. The triggering events and the delay times which together establish a time schedule are determined by the master processor.

A scheduling method according to the preamble of claim 1, for a modular print engine, is disclosed in European Patent application having publication no. EP 747793. The modules of the engine are in this case formed by the various subassemblies of the printer, such as paper storage tray, a sheet feeder, a paper conveyor, a printing device and the like. These modules interact in that a paper sheet is passed through the engine from module to module. The scheduler determines the modules needed for a given task and establishes a sequence of actions on the basis of models representing the functions of the various modules.

In order for the modules to cooperate without timing conflicts, it is generally required that all the timing constraints of the various modules have to be taken into consideration in the scheduler. As a result, the conventional scheduler is relatively complex, and difficulties or errors are likely to occur when the system configuration is changed, i.e. by adding, removing or replacing individual modules.

SUMMARY OF THE INVENTION

It is an object of the invention to provide a scheduling method and a scheduler which permit a high variability in the engine configuration and are robust against alterations of this configuration.

According to the invention, this object is achieved by a scheduling method performed by a modular search engine, wherein each module allocates the timings for its own actions by sending a timing offer to the module to which the output is to be delivered and receiving from that module a message accepting or rejecting the offer, the timing offer being based on the internal status and timing constraints of the module itself and, if an input from an other module is needed, on a timing offer from that module.

The scheduling process is highly decentralized, so that the modules practically act as autonomous entities which negotiate the time schedule among each other. Most importantly, each module only needs to have information on its own functionality, status and timing constraints and on the type of interaction with other modules. From the view point of an individual module, the status or the timing constraints of other modules are irrelevant. This has the advantage that the internal configuration of each module may be altered as desired, and it is not necessary to notify these alterations or their consequences to other modules or to a central controller. As far as the scheduling process is concerned, the alterations of the internal configuration will only be reflected by the timing offers sent to the other modules, and, as a consequence, the other modules only have to react on these timing offers in the usual way without having to know the alterations that have been made.

As a result, the scheduling method offers high flexibility in the engine configuration and is at the same time of a general applicability so that it can be used for a large variety of engine types and engine designs.

The term "module" as used herein refers not only to the engine subassemblies performing the task of the module but also to the associated control system which itself may be formed by hardware and/or software. Of course, it is the control system of the module that determines and sends the timing offer to the control system of another module, whereas it is the engine subassembly that delivers the output, e.g. a copy sheet, to an other engine subassembly. It is also noted that the term "chain" should not only be interpreted as a flow from one start point to one end point, but also includes several flows coming together or splitting up.

When it was stated above that the scheduling process is "decentralized" this is meant primarily in a logical sense and not necessarily in a physical sense. Thus, it is possible within the scope of the invention that the control systems of the various modules are centralized in a single multi-processor control unit or even in a single processor. In the latter case, the control functions of the modules are implemented as software modules or subroutines. Then, when a module, i.e. a system subassembly is altered or replaced, this implies that the associated subroutine is also altered or replaced.

As an alternative, it is of course possible that the control systems of the various modules are configured as separate control units or processors which communicate with each other via a bus system. In this case, the control unit of an individual module may also be physically integrated into the corresponding engine subassembly. As an example, consider a sorter or a stapling device that is connected to the paper output of a copier and that has its own control unit that is connected to the control unit of the copier.

In any case, the decentralized architecture has the advantage that maintenance and modification of the engine are greatly facilitated because the necessary interventions in the hardware and/or software of the scheduler are determined in a natural way by the structure of the modules and their interactions.

The invention further has the advantage that the scheduling process is inherently safe, because each timing offer has to be either accepted or rejected by the receiving module. This implies that the receiving module has to check whether the offered timing would lead to a conflict. As a result, a timing error will lead to a rejection of a timing offer and hence to a failure of the scheduling attempt but not to any damage to the engine subassemblies.

The requirement that at least one module of the engine does not need an input from another module for performing a first action guarantees that the scheduling process will not be circular. The scheduling process can always be started with the module which does not depend on an input from another module so that all the information needed for issuing a timing offer is available in this module. Of course, this module might well depend upon an external input which could then be used to trigger the whole scheduling process. In the case that the engine is adapted to perform a variety of different tasks, it may depend on the task to be performed which of the modules fulfils the requirement that it does not need an input from another module.

In the simplest case, the timing offer consists only of a single time value indicating the moment at which the interaction between the sending and the receiving module shall take place. The receiving module then has only the choice to accept or reject this offer. The scheduling attempt is successful only when all the timing offers issued by all of the modules are accepted by the respective receiving modules. If only one timing offer has been rejected, then the scheduling attempt has failed. When another scheduling attempt is triggered immediately after the first attempt has failed or after a certain delay time, there is a chance that the new attempt will be successful because the internal status of the various modules will have changed in the meantime.

The efficiency of the scheduling process can however greatly be enhanced by requiring that each timing offer specifies a set of time values, e.g. a certain time interval within which the interaction may take place from the viewpoint of the sending module. Then, the receiving module can accept the timing offer under the more general condition that the offered time interval or set includes at least one time point which will not lead to a conflict. The message with which the timing offer is accepted will then include an indication of this time point or the earliest one of these time points, and both modules will then allocate this time point to the interaction. Thus, the likelihood that the scheduling attempt is successful will be increased significantly. As a further extension of this concept, it is possible that a timing offer includes a plurality of time intervals.

In a complex machine capable of performing different kinds of tasks it will generally be the case that not all of the available modules are actually involved in a specific task. For complex machines it is generally advantageous to have an engine controller which analyzes a requested task, splits it up into subtasks to be performed by specific modules and selects the modules for performing the necessary actions. The engine controller will then send an allocate action request to the selected modules.

Most of the modules will not be able to respond to this request immediately, because they have to wait for timing offers from other modules. However, at least one module that is not dependent on an input from other modules can respond immediately by sending a timing offer, a so called allocate forward message, to the module to which it has to deliver its output. This message will then enable the receiving module to calculate and send its own timing offer to yet another module, so that a cascade (namely, multiple allocate forward messages) is triggered.

This cascade will finally end at a terminal module, i.e. a module which either delivers its output to the outside world and not to another module, or takes up the output of its predecessor module (e.g. an internal sheet collector). This module then has the necessary information for finally allocating a time point to the sole or to each interaction with the preceding module or modules, and it will indicate this time point to preceding module or modules in a so-called allocate backward message.

This will again enable the preceding module to send an allocate backward message to its predecessor, so that a cascade of allocate backward messages will roll back through the system and will finally reach the module which has sent the first allocate forward message. Then, in case of success, the timings for all actions have been allocated appropriately, and this is signalled to the engine controller.

Preferably, each module sends an allocate action reply message to the engine controller so that the engine controller has reliable and even redundant information on whether or not the scheduling process has been successful. The allocate action replies sent from each module to the engine controller may include the allocated timings of the respective actions, so that the whole timing schedule will be available in the engine controller. It should be noted however that the engine controller has not been involved in establishing this schedule.

When a module rejects a timing offer, it will also signal this to the engine controller, and all other modules will be commanded to abort the scheduling attempt.

When the timing offer is rejected, the corresponding allocate backward message preferably includes information on a time interval or time intervals in which the module is not ready for accepting the input. In a simplified practical embodiment the allocate backward message indicates the earliest time point after which the input can be accepted. The engine controller may then issue a retry action allocation request which is distinguishable from the first allocate action request and causes the modules to modify their timing offers in accordance with the time information received with the allocate backward messages. As a result, the new timing offer to be sent will have a significantly higher chance of being accepted.

More advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DETAILED DESCRIPTION OF THE PREFERRED EMBODIMENTS

In the description below the invention is explained for an electrophotographic printer.

Figure 1:
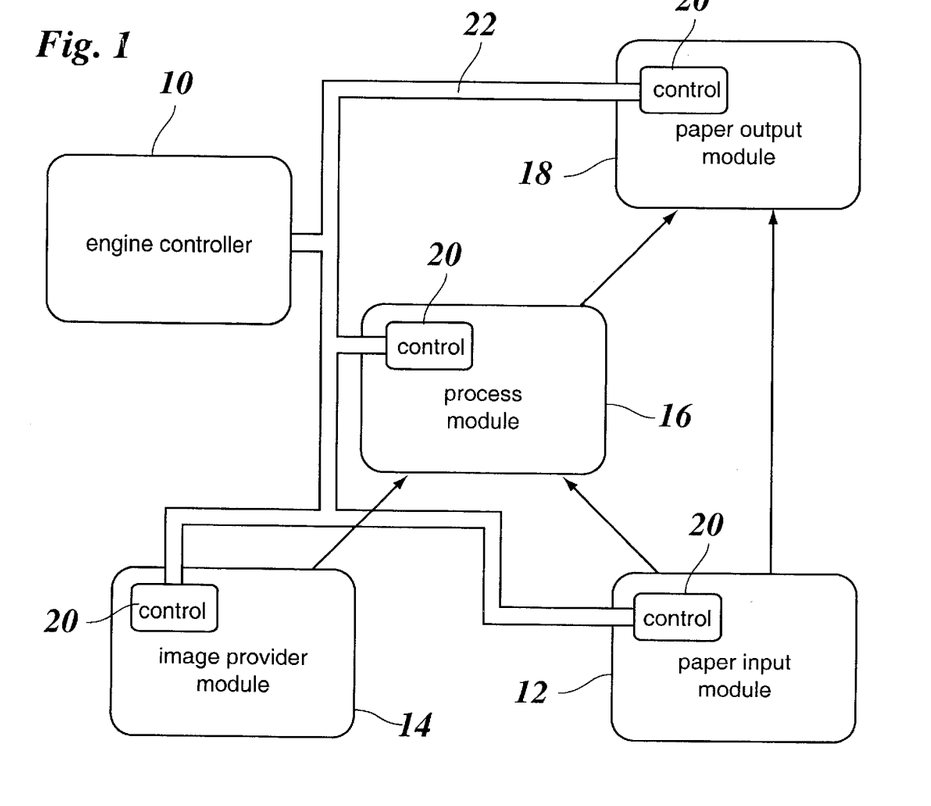
FIG. 1 is a simplified block diagram of a printer as an example of a modular machine to which the invention is applicable.

As is shown in FIG. 1, a printer has a modular architecture and comprises a control module 10 and four action modules, i.e. a paper input module 12, an image provider module 14, a process module 16 and a paper output module 18. The action modules 12, 14, 16 and 18 may be considered as engine subassemblies which, in the shown embodiment, each include their own control unit 20, e.g. a processor. The control module 10 which is called "engine controller" and the control units 20 of the various action modules communicate with each other via a bus system 22 and, in combination, form a scheduler which schedules the tasks to be performed by the action modules.

Figure 2:
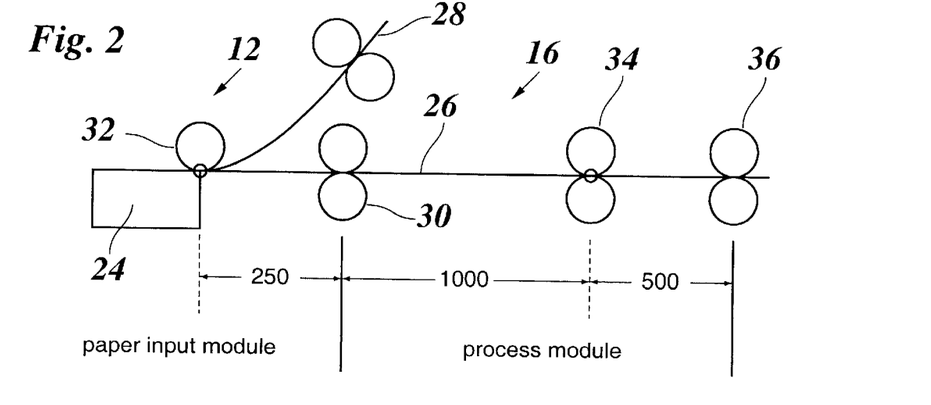
FIG. 2 is a schematic view of two modules disposed along a paper path of the printer shown in FIG. 1.

The paper input module 12, which is also shown in FIG. 2, has the function to separate individual paper sheets from a stack 24 and to feed them either into a paper path 26 or into bypass 28. The paper path 26 leads through the process module 16 and further to the paper output module 18, whereas the bypass 28 leads directly from the paper input module 12 to the paper output module 18. This bypass may be used for example for inserting a blank separating sheet between two printed sheets.

The image provider module 14 assembles image data for a page to be printed on the basis of information received from an external device, e.g. a host computer, and exposes a photoconductor belt (not shown) line by line with these image data.

In the process module 16 the image received as an input on the photoconductor belt (which has previously been prepared by charging with an electric surface charge), is developed with toner and is conveyed to a transfuse point where it is transferred onto a paper sheet supplied from the paper input module 12 and is simultaneously fixed on the paper sheet. The paper sheet with the printed image thereon is then sent to the paper output module 18. The paper output module 18 has the function to discharge the printed copy to, for example, a stapler which forms the output device of the printer.

Interactions between the various action modules are symbolized by arrows in FIG. 1. The output of the paper input module 12 is the paper sheet which is fed to the process module 16 along the paper path 26. From the viewpoint of the process module 16, this paper sheet forms an input received from the module 12. The interaction between the paper input module 12 and the process module 16 can thus be described as the event in which the paper sheet is handed-over from the paper input module 12 to the process module 16. Similarly, the interaction between the image provider module 14 and the process module 16 is the event that the first image line is exposed on the photoconductor belt.

It will be observed that the process module 16 receives two inputs, i.e. one from the paper input module 12 and one from the image provider module 14, and delivers one output to the paper output module 18. The modules 12 and 14, however, do not receive an input from anyone of the other modules. Conversely, the paper output module 18 receives inputs from the process module 16 and from the paper input module 12 but does not deliver an output to anyone of the other modules.

A scheduler formed by the engine controller 10 and the control units 20 of the various action modules has to schedule the timings for the interactions between the action modules so that these modules will cooperate in the desired manner. Specifically, a unique time value has to be allocated to each interaction event. The appropriate interaction timings will depend on the internal status of the various action modules and on their internal timing constraints. As an example for such timing constraints, it can be seen in FIG. 2 that the paper input module 12 needs a certain time for feeding a sheet to the process module 16. In the shown example it is assumed that the time required for this amounts to 250 time units. The time units may be considered to be clock periods of a machine clock.

In FIG. 2, the boundary between the paper input module 12 and the process module 16 is defined by the nip of a pair of drive rollers 30. When the leading edge of the paper sheet enters into this nip, the responsibility for the further handling of the paper sheet is taken over by the process module 16.

A separating roller 32 disposed on the stack 24 defines a reference point for the internal representation of positions and timings within the paper input module.

Similarly, the nip of a pair of rollers 34 within the process module 16 defines a reference point for the process module 16. In an analogous way, a unique reference point is defined for each of the action modules.

The boundary or interaction point between the process module 16 and the paper output module 18 is defined by another pair of rollers 36 shown in FIG. 2. As is exemplified by the process module 16 in FIG. 2, each module typically has a timing constraint e.g., (1000 time units) indicating the time needed for conveying the leading edge of the paper sheet (or image) from the input boundary (at 30) to the reference point (at 34), and another timing constraint (e.g., 500 time units) representing the time needed for conveying the leading edge from the reference point to the output interaction point (at 36).

Another important timing constraint is the so-called time between two actions which is the total time interval required between the beginning of an action and the beginning of the next subsequent action. This time between two actions is composed of two time intervals. The first time interval is the time for executing the action, in the shown example represented by the time which it takes to move the complete sheet past the reference point. This first time interval also includes an extra time interval needed for changing the inter-sheet distance in case of a transport velocity change inside the module, such to avoid a collision between sheets when the velocity is decreased again further in the transport path. The second time interval is the required safety-gap between the end of the first action and the beginning of the next action.

An example of possible timing constraints for the action modules 12 to 18 is given table I.

TABLE I

Example timing constraints for the modules

| | Time Units |
|---|---|
| Paper input module 12 | |
| Transfer time from separation point to process module Transfer time from separation point to bypass output | 250 200 |
| Time between two actions | 400 |
| Image provider module 14 | |
| Image preparation | 50 |
| Print duration | 450 |
| Time between two actions | 450 |
| Process module 16 | |
| Paper transfer from paper input to transfuse point | 1000 |
| Image from printhead to transfuse point | 800 |
| Photoconductor preparation time | 150 |
| Paper transfer from transfuse point to paper output | 500 |
| Time between two actions | 490 |
| Paper output module 18 | |
| Paper transfer from process to stapler | 2500 |
| Paper transfer from bypass to stapler | 2300 |
| Time between two actions | 440 |

None of the timing constraints indicated above is stored in the engine controller 10, nor does the engine controller 10 store any information on the internal status of the action modules. The timing constraints pertinent to the image provider module 14 and the information indicating the internal status of the image provider module 14 are stored only in the control unit 20 of the image provider module 14. Similarly, the timing constraints and information on the internal status for the other action modules are stored only in the control units 20 associated with the respective module. As a consequence, the scheduling process requires a communication between the various control units 20 and the engine controller 10. A protocol for this communication is indicated below in Table II.

TABLE II

Communication Protocol

| message | parameters | values |
|---|---|---|
| from engine controller 10 to any action module | | |
| allocate action request A [ , ] | xxActionSpecification | |
| | StartTime | |
| retry action allocation r A [ , ] | xxActionSpecification StartTime | |

TABLE II-continued

Communication Protocol

| message | parameters | values |
|---|---|---|
| undo action allocation undo all allocations from action module to engine controller | ActionID | |
| allocate action reply R[ , , ] R[ ] | ReplyMessage | OK NOT OK BLOCK STOP |
| | ActionStartTime ActionEndTime | |
| unbloc allocation from action module to action module: forward | | |
| allocate forward F [ , , ] F [ ] | ForwardMessage InteractionStartTime InteractionStopTime | OK STOP |
| from action module to action module: backward | | |
| allocate backward B [ , ] B [ , ] | BackwardMessage InteractionTime | OK NOT OK STOP |

The meaning of the messages listed in Table II and the principle of the scheduling process will now be explained in conjunction with FIG. 3 which gives an example for a successful scheduling process utilizing the timing constraints indicated in Table I. The engine controller 10 and the action modules (more specifically, their control units 20) are symbolized in FIG. 3 by vertical dashed lines. Messages exchanged between these modules are symbolized by horizontal arrows. It can be assumed that the messages occur in the sequence from the top to the bottom in FIG. 3.

The scheduling process starts when a printing instruction "PRINT" for printing a page is received by the engine controller 20. The engine controller 20 then analyzes this printing instruction and determines which of the action modules are needed for the requested printing operation and which actions have to be performed by these modules.

In general, the selection of modules and the actions performed by these modules may vary depending on the printing instruction. In the simplified example shown here, however, all four action modules are needed. This is why the engine controller sends an allocate action request A[] to each of the action modules. As is shown in Table II, this request has two parameters termed xxActionSpecification and Start-Time. In the parameter xxActionSpecification, xx identifies the action module, i.e. either the paper input module 12 (PI), the image provider module 14 (IP), process module 16 (PR) or the paper output module 18 (PO). This parameter also specifies the type of action to be taken.

For example, the action to be taken by the paper input module 12 is in this case to deliver a sheet at its output port (roller pair 30) connected to the process module 16. Another possible action would have been to deliver a blank sheet at its output port in the by-pass 28, connected directly to the paper output module 18 via the bypass 28. The parameter StartTime indicates the earliest time at which the requested action is allowed to start. In the shown example the value of StartTime is 10 for each of the messages A[PI,10] sent to the paper input module 12, A[IP,10] sent to the image provider module 14, A[P, 10] sent to the process module 16 and A[PO, 10] sent to the paper output module 18.

These messages cause each of the action modules to calculate possible timings for the interactions on the basis of its own timing constraints and its internal status. For simplicity it is assumed here that the internal status of all action modules is "ready", so that they are all prepared to start their actions immediately.

For example, the control unit 20 of the paper input module 12 decides that it can immediately start with feeding a sheet from the stack 24 to the process module 16. However, since it was requested that the action should not start before the time 10, the paper input module 12 decides that the paper feed will be started at b 10. Then it is derived from the internal constraints that it will take 250 time units until the sheet is handed-over to the process module 16. The earliest possible timing for the interaction with the process module is accordingly 260. Any later timing would of course also be possible, so that an allowed or proposed time interval for the interaction with the process module ranges from 260 to infinity. Accordingly, the paper input module 12 sends to the process module the allocate forward message F[OK, 260, ∞]. The value OK of the parameter forward message indicates to the process module 16 that the scheduling procedure shall be continued. The values 260 and ∞ for the parameters InteractionStartTime and InteractionStopTime, respectively, indicate a timing offer, i.e. the time interval within which the interaction can take place from the viewpoint of the paper input module 12.

Similarly, the image provider module 14 finds that its action should not start before the time 10, and it concludes from its internal constraints that it will take 50 time units to prepare the image data. The interaction with the process module is in this case the event that the first image line is exposed on the photoconductor belt. Thus, the earliest possible time for the interaction is 10+50=60. Of course, the printing process' will not be completed at this time, but it would still take another 450 time units until the last line of the image is printed. This, however, is not relevant for the process module 16. Thus the message sent to process module is F[OK, 60, Having received the forward messages from the paper input module 12 and the image provider module 14, the process module 16 knows that the paper sheet will not be available at the nip of the rollers 30 before the time 260. It then will take another 1500 time units until the leading edge of the sheet has been transferred through the process module 16 to the roller pair 36 which is the interaction point with the paper output module 18. Thus, the earliest possible time for the interaction between the process and the paper output is 260+1500=1760 time units. A corresponding message F[OK, 1760, ∞] is sent to the paper output module 18.

The paper output module 18 checks its internal status and finds that it will be ready to handle the sheet when it arrives at the earliest possible timing, i.e. at 1760. Therefore it accepts the timing offer from the process module 16 and finally fixes the interaction time to the earliest moment, i.e. 1760. Thus, the allocate backward message sent back to the process module 16 is B[OK, 1760]. The value "OK" for the parameter BackwardMessage indicates here that the timing offer has been accepted.

By inspecting its own timing constraints (Table I) the paper output module 18 further finds that, from the interaction at 1760, it will still take another 2500 time units until the sheet is output to the stapler and thus leaves the engine. Accordingly the action of the output module will begin at 1760 and end at 1760+2500=4260. This information is transmitted to the engine controller 10 by the allocate action reply message R[OK,1760,4260].

The process control module 16 has been advised by the paper output module 18 that the printed sheet is expected at the interaction point at 1760. From its own timing constraints (Table II) the process module 16 knows that 800+500=1300 time units are needed for transferring the leading edge of the toner image on the photoconductor belt from the interaction point with the image provider module 14 to the transfuse point and then transferring the printed sheet from the transfuse point to the interaction point with the paper output. By subtracting 1300 from 1760 it finds that the leading edge of the image should be received from the image provider at 460.

A comparison with the interval (60, ∞) offered by the image provider module 14 shows that the scheduled interaction time is within the offered interval, so that the timing offer is accepted, at least as far as interaction with the image provider module 14 is concerned. Note that the photoconductor preparation time of 150 is much shorter than 460 and therefore does not form a constraint. Consequently, it plays no role in the schedule negotiations, although, of course, it must be scheduled. For the interaction with the paper input, the timing constraints of the process module 16 require that the sheet is received 1500 time units before scheduled timing 1760, i.e. right at the beginning of the interval (260, ∞) offered by the paper input module 12. Thus, this offer is also be accepted. As a result, the messages B[OK, 460] and B[OK, 260] are sent to the image provider module 14 and the paper input module 12, respectively. Further, a message R[OK, 260, 1760] indicating the start and end times of the action is sent from the process module 16 to the engine controller 10.

The image provider module 14 now knows that the image has to be transferred to the process module 16 at 460. Subtracting the preparation time of 50 gives 410 as the action start time for the image provider module 14. Adding again the image preparation time 50 and the print duration 450 to the action start time gives the action end time 910. Thus the message R[OK, 410, 910] is sent to the engine controller 10. Likewise, the paper input module 12 indicates its action start and end times to the engine controller by the message R[OK, 10, 260].

It will be observed that in the process described above each allocate action request sent by the engine controller is answered by an allocate action reply. Likewise, each forward message sent by any of the action modules is answered by a backward message. These rules are generally observed in the shown embodiment and assure a high level of redundancy and safety. Thus, the engine controller 10 positively knows from the four allocate action replies that the scheduling process has been successful. Likewise, each action module knows from the received message "OK" that the scheduling process has been successful and the allocated timings are really valid.

Figure 4:
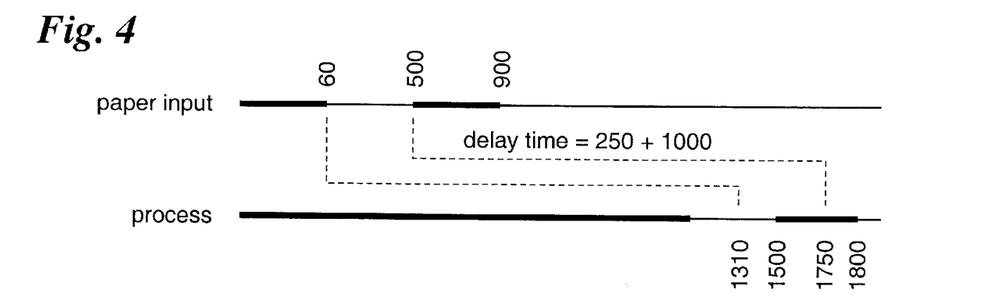
FIG. 4 is a timing diagram illustrating an example of internal status of the modules shown in FIG. 2.

The case that a scheduling attempt cannot be successful due to the timing constraints and the internal status of one of the modules will now be discussed in conjunction with FIGS. 4 and 5. FIG. 4 illustrates a time axis for the status of the paper input module 12 and the status of the process module 16, respectively. Bold lines indicate time periods in which the modules are busy so that no further actions can be scheduled in these periods. Faint lines indicate the time periods which are free for scheduling further actions.

Suppose, the paper input module 12 has free time between 60 and 500 and then again after 900. Since the delay time for the transfer of a sheet from the reference point of the paper input module 12 to the reference point of the process module is 1250, the free time of the paper input module 12 corresponds to the interval between 1310 and 1750 on the time axis of the process module 16. Although the process module 16 is ready for action at 1310, it is not ready in a time interval between 1500 and 1800. The reason may be that the process module 16 is busy with an action that has been scheduled previously or that it is not operative in this interval because the photoconductor belt has a weld that is not useable for printing, and said weld passes the transfuse point during this time interval.

Figure 3:
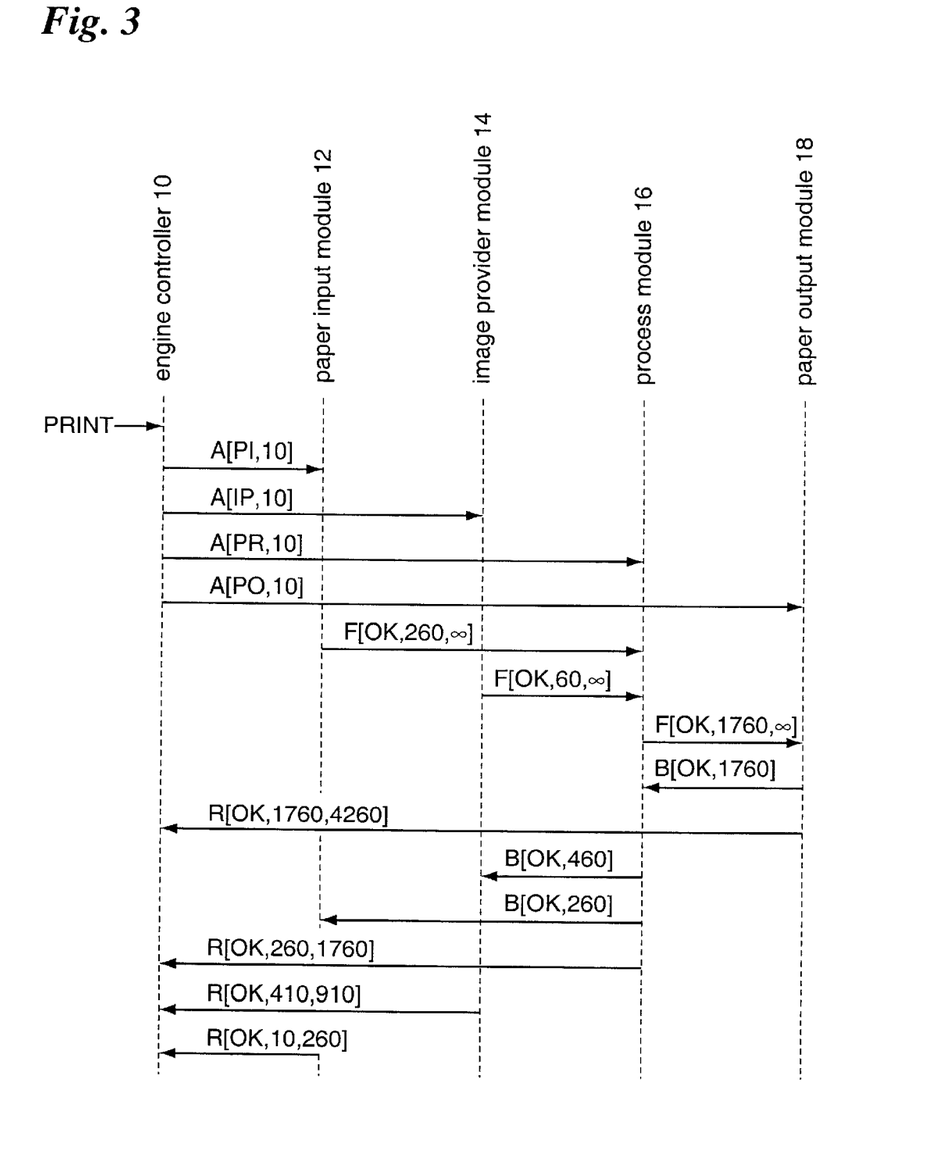
FIG. 3 is a diagram illustrating an example of a scheduling process according to the invention.
Figure 5:
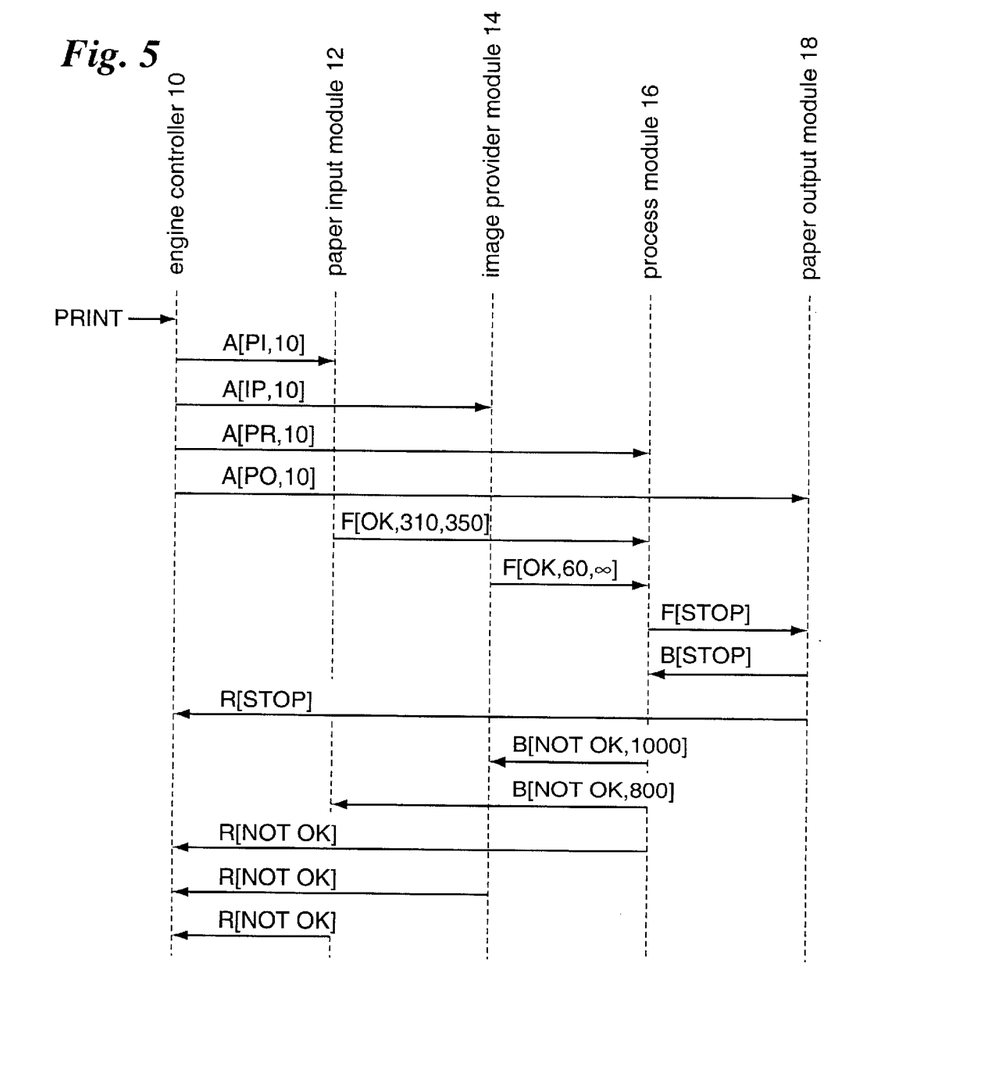
FIG. 5 is a diagram similar to FIG. 3 but showing a scheduling attempt which is unsuccessfull under the conditions illustrated in FIG. 4.

In FIG. 5 the allocate action requests are the same as in FIG. 3. However, paper input module 12 now finds that its action cannot start (at the reference point) before the time 60 and must be completed before the time 500. Table I shows that the time between two actions for the paper input module is b 400, so that the action must not start later than at 100 in order to be completed in time. Thus, the time slot for starting the paper feed action (at the separating roller 32) is from 60 to 100. Adding the transfer time of 250 gives a time slot between 310 and 350 for the interaction with the process module 16. This is reflected by the message F[OK, 310, 350] in FIG. 5.

The message sent from the image provider module 14 to the process module 16 is the same as in FIG. 3. The process module 16 analyzes the message received from the paper input module 12 and finds that the leading edge of the sheet would reach the reference point (namely, the transfuse point) of the process module 16 at 1310, and it further concludes from its own internal state that the action would have to be completed already at 1500, so that only 290 time units would be available for the action. However, Table I shows that the time between two actions for the process module 16 is 490. In case of the interaction time of 350 the time available for completing the process would be even shorter, so that none of the timings in the interval between 310 and 350 offered by the paper input module 12 is acceptable. Thus, the scheduling attempt has failed, and it is not necessary for the other modules to continue with this attempt. This is why a message F[STOP] is sent to the paper output module 18. The paper output module 18 acknowledges this message by retransmitting a message B[STOP] to the process module 16. The paper output module 18 also sends the reply message "STOP" to the engine controller 10 in its allocate action reply.

The process module 16 has found that the free time before 1500 (in relation to its own reference point) is not useable because the paper input module 12 is not capable of providing a sheet in time. It therefore concludes from its own internal status that an action cannot start before 1800. Since the transfer time between the interaction point with the image provider and the reference point of the process module 16 is 800 time units, the earliest possible time for interaction with the image provider module 14 is at 1000. In case of the paper input module 12 the transfer time is 1000 and the earliest possible interaction time is 800. The message B[NOT OK, 1000] sent to the image provider module 14 indicates that the timing offer (60, ∞) of the image provider module 14 is rejected and any proposed interaction time before 1000 would also be rejected. It is to be noted that the reason for this rejection is a timing conflict between the paper input module 12 and the process module 16. However, this information is not relevant for the image provider module 14. The message B[NOT OK, 800] sent to the paper input module 12 indicates that the timing offer (310, 350) of the paper input module 12 has been rejected and any proposed interaction time before 800 would also be rejected.

Finally, the process module 16, the image provider module 14 and the paper input module 12 report to the engine controller that the timing offers they have received or sent have been rejected via the messages R[NOT OK].

Again, the engine controller 10 receives four reply messages all indicating this time that the scheduling attempt has failed. The difference between the reply messages "STOP" and "NOT OK" is that in case of "NOT OK" a timing offer has been rejected and in the case of "STOP" a timing offer has not even been made. This makes it easier to trace back the reason for the failure and thus facilitates maintenance and debugging.

Figure 6:
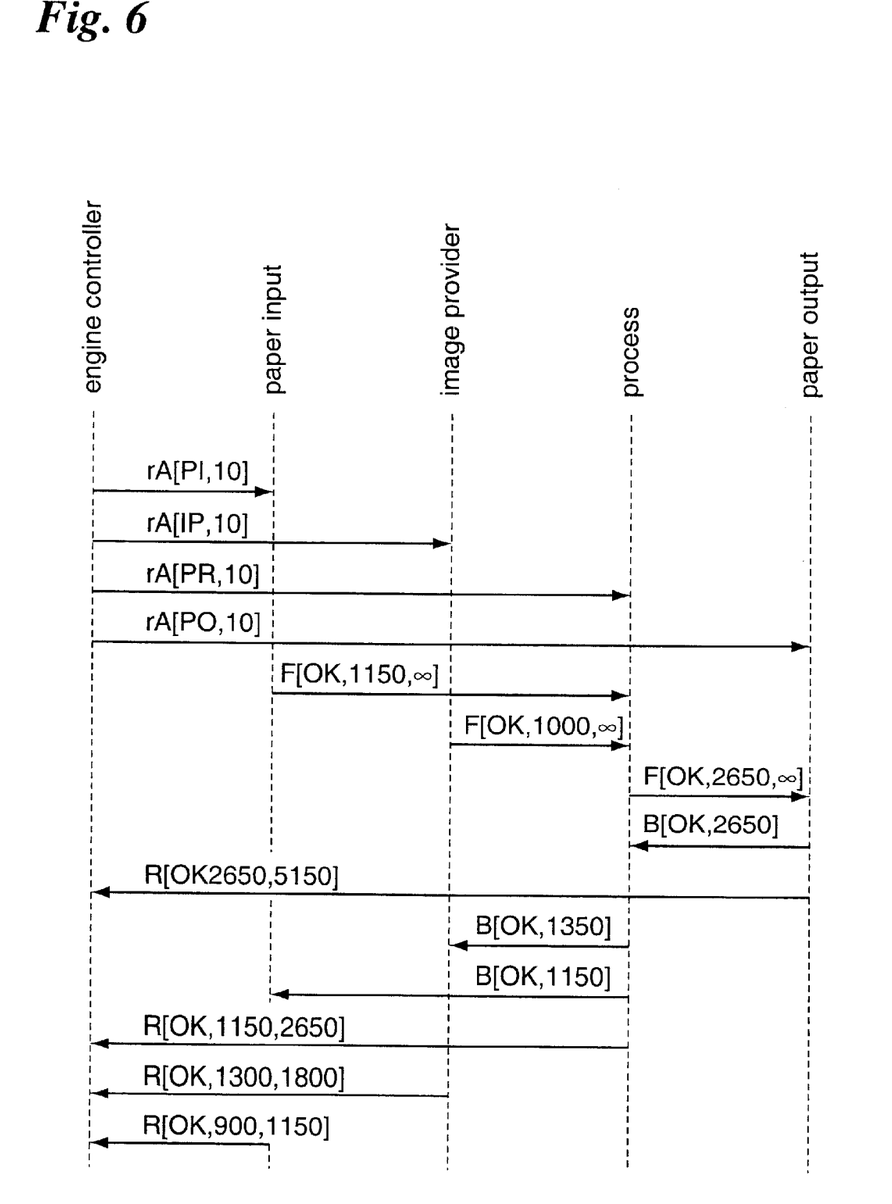
FIG 6 is a diagram illustrating a successful scheduling process retried subsequent to the unsuccessful attempt shown in FIG. 5.

As is shown in FIG. 6, the engine controller 10 may now deliver retry action allocation requests rA[] to the action modules. These requests are practically identical with the allocate action requests, but they indicate that, now, the time limits indicated in the backward messages B[NOT OK, 1000] and B[NOT OK, 800] have to be observed.

Thus, the paper input module 12 concludes that the earliest possible interaction time is 800, so that in view of the transfer time of 250 its feed action must not start before 550. However, FIG. 4 shows that the paper input module 12 is not ready between 500 and 900, so that the feed action can only start at 900 or later. Adding the transfer time of 250 again gives the forward message F[OK, 1150, ∞].

The image provider module 14 offers 1000 as the earliest possible interaction time, in accordance the time limit previously imposed by the process module 16. The rest of the procedure shown in FIG. 6 is equivalent to what has been shown in FIG. 3 and leads to a successful scheduling.

Figure 7:
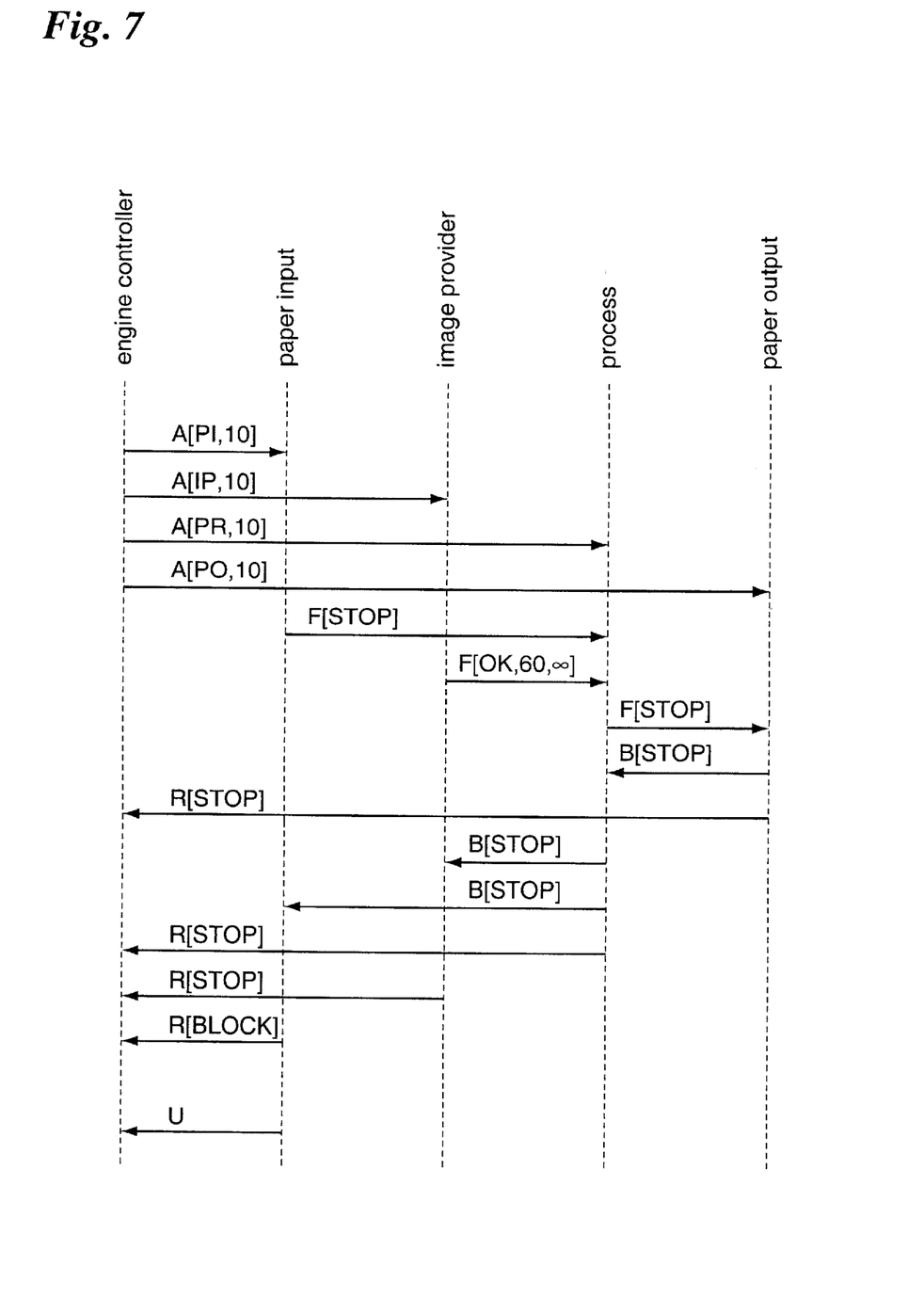
FIG. 7 is a diagram of a scheduling attempt which is unsuccessful because a modules is blocked.

FIG. 7 shows another example for an unsuccessful scheduling attempt, but this time the reason is that the paper input tray is blocked because it is being refilled. In this case, the paper input module 12 cannot send a timing offer because it does know when the refilling process which is performed manually by a user will be terminated. This is indicated by the forward message "STOP" in the allocate forward message sent to the process module 16. The process module 16 reacts by sending a forward message "STOP" to the paper output module 18. Likewise, the regular forward message sent by the image provider module 14 is answered by a backward message "STOP". All the modules that have received a "STOP" message acknowledge this message in a corresponding backward message and send a corresponding report R[STOP] to the engine controller 10. Only the paper input module 12 which is currently blocked reports the message R[BLOCK], thereby indicating that a retry action allocation request is not useful. When, finally, the refilling operation has been completed, and the paper input is no longer blocked, this is signalled to the engine controller by an unblock message U. Then, another allocate action request (not retry) can be issued by the engine controller.

The messages "undo action allocation" and "undo all allocations" indicated in Table II have only been added in order to enhance the functionality of the engine controller 10.

In the example shown in FIG. 2 it has been assumed that the interaction point or boundary between two modules is formed by a nip of two transport rollers 30 which belong to the downstream module (the process module 16 in the given example) and determine the speed with which the sheet is transported as soon as the leading edge has been taken over. Sometimes it is convenient or even necessary however to select other locations for the module boundaries, i.e. the interaction points. An example is shown in FIG. 8 where the interaction point IP between two modules, module 1 and module 2, is located halfway between the last pair of rollers 38 of module 1 and the first pair of rollers 40 of module 2.

Figure 8:
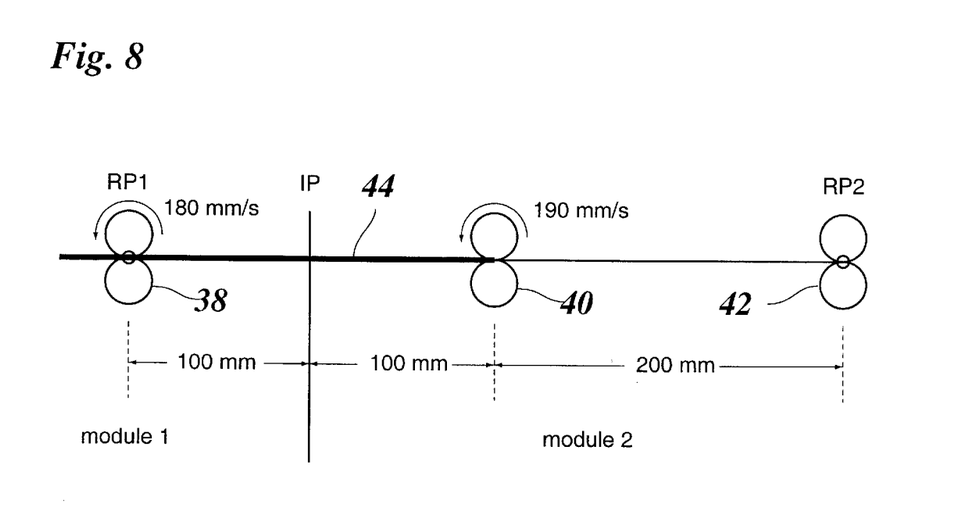
FIG. 8 is a schematic view of two modules disposed along a paper path.

In the example of FIG. 8, the pair of rollers 38 rotates with a circumferential speed e.g. of 180 mm/s, whereas the pair of rollers 40 rotates with a circumferential speed of e.g. 190 mm/s. As a result, the speed with which the leading edge of a sheet is moved from IP to the rollers 40, i.e. within module 2, is not determined by the components of module 2 but by the components (rollers 38) of module 1. In a certain sense, this violates the principle that all the modules should be autonomous entities which need only information on their internal status and timing constraints.

A similar problem occurs for the module 1. As is shown in FIG. 8, the reference point RP1 of the module 1 is defined by the rollers 38, whereas the reference point RP2 of the module 2 is defined by another pair of rollers 42. The length of a sheet 44 is indicated by a bold line, and it can be seen that this length is larger than the distance between the rollers 38 and 40. As a result, the leading edge of the sheet reaches the nip between the rollers 40 before the trailing edge has left the reference point RP1.

It will be recalled that the time between two actions for the module 1 is determined among others by the time it takes to move the complete length of the sheet 44 past the reference point RP1. This time, however, depends not only on the speed of the rollers 38 but also on the speed of the rollers 40 of module 2, which again violates the principle that the modules should be independent from one another.

In more general terms, problems of this kind will always occur when the interaction between two modules is constituted by a transfer of an extended object (such as the sheet 44) from one module to the other. Then, in a certain sense, the transport system of the first module forms also part of the internal configuration of the second module and vice versa.

In order to cope with these problems and to preserve the independence of the modules, it is convenient to add to the control unit of module 1 a function asking its successor (module 2) to indicate the speed with which the object (sheet 44) is taken over. Likewise the control unit of module 2 will include a function asking its predecessor (module 1) to indicate the speed with which the object is supplied. These functions enable both modules to calculate their internal timing constraints correctly, irrespective of any possible changes of the transport speeds in the neighbouring module. Such functions therefore provide a higher flexibility in the configuration of the system and especially in the positioning of the interaction points.

Figure 9:
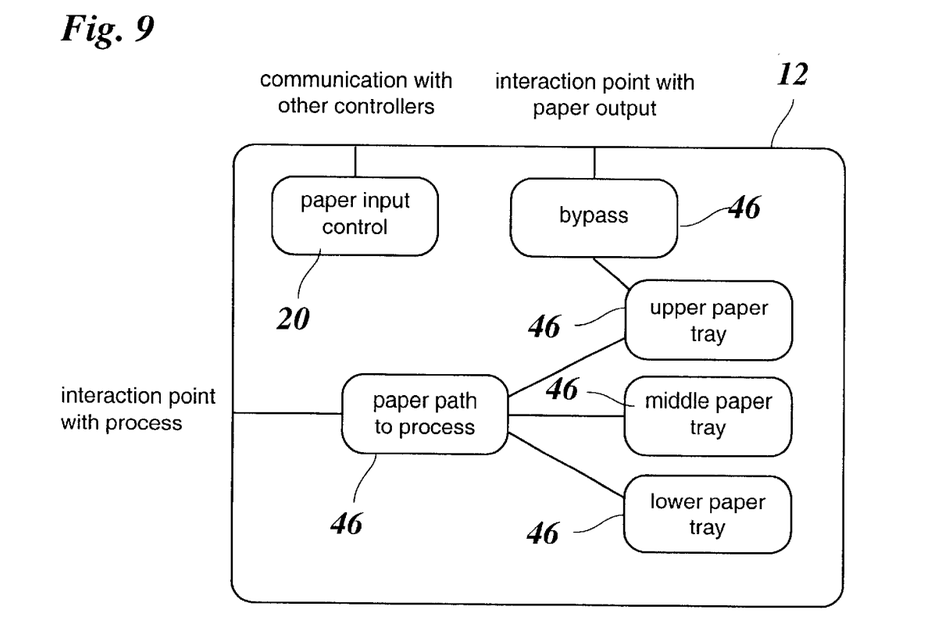
FIG. 9 is more detailed block diagram of the paper input module of the printer in FIG. 1.

Another possible extension of the concept described above is an engine configuration in which the modules and their associated controllers form a hierarchical structure. As an example, FIG. 9 shows a more detailed block diagram of the paper input module 12 that has already been shown in FIG. 1. In FIG. 9, the module 12 with its associated control unit 20 is broken down to a number of sub-modules 46 including for example upper, middle and lower paper trays, a bypass conveying system for feeding sheets from the upper paper tray directly to the paper output 18 (FIG. 1), and a conveying system for feeding sheets from any of the paper trays to the process module 16.

In relation to the sub-modules 46 of FIG. 9, the control unit 20 has the same function as the engine controller 10 has in relation to the modules 12, 14, 16 and 18. Thus, the scheduling method that has been described above can also be applied internally of the module 12 for scheduling the actions of the sub-modules 46. When an allocate action request is transmitted from the engine controller 10 to the control unit 20 of the module 12, the control unit 20 will itself issue another allocate action request to the sub-modules 46 and will thus trigger a scheduling process within the module 12. The result of this scheduling process is available in the control unit 20 and can then be used to establish the allocate forward messages to be sent to the modules 16 and 18.

When the allocate forward messages sent by the various modules offer a choice of a plurality of possible interaction timings and leave the final decision to the receiving module as in the examples described above, then it is an important requirement that each module must receive only a single allocate backward message as a response. If there would be two different allocate backward messages from two different modules and specifying different interaction times, then there would be a risk of conflict. This, however, does not generally exclude the possibility that a module delivers different outputs to different modules in one and the same action.

As an example, one may think of a punching machine in which the action consists of punching an article out of a blank. A first output would then be the article that has been punched out and is delivered to a product handling module, and a second output might be the waste that is delivered to a waste handling module. In such a case, only one of the receiving modules, e.g. the handling system for the punched article can be allowed to allocate the final interaction timing, and the other module (the waste handling system) does not have any choice but must either accept or reject the allocated timing, in the latter case blocking the whole action. Of course, in case the other module does not have limiting constraints, it will automatically accept the allocated timing.

Figure 10:
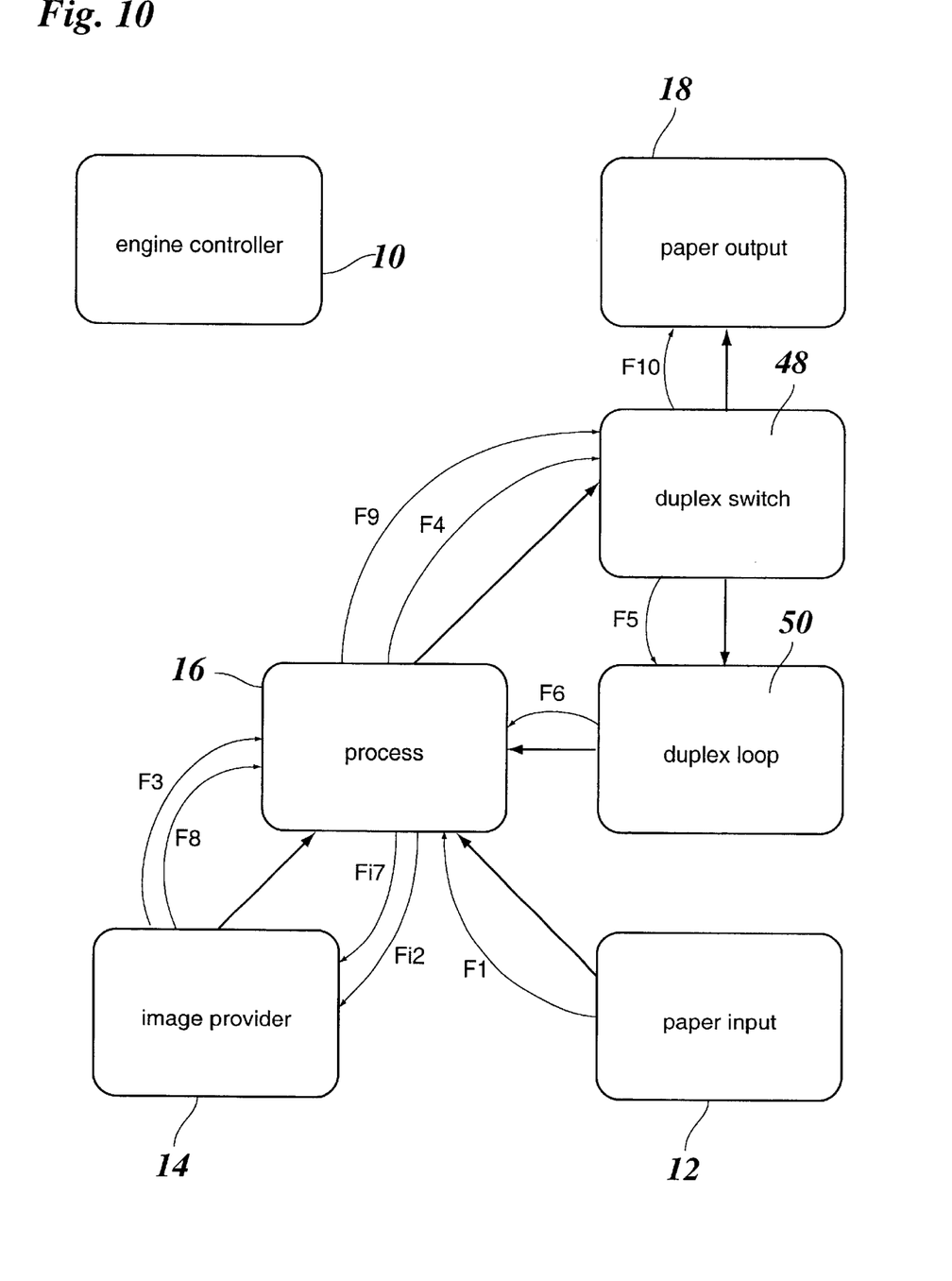
FIG. 10 is a block diagram of a duplex printer and illustrates messages exchanged between the various modules according to a modified embodiment of the scheduling process.

Another special consideration is required in those cases in which the chain of interactions between the various modules forms a closed loop, as may be the case for example in a duplex printer. FIG. 10 shows a block diagram of a duplex printer which, in comparison to FIG. 1, includes a duplex switch 48 and a duplex loop 50 as additional modules. Interactions between the modules are again represented by straight arrows. In the duplex mode, a copy sheet on which an image has been printed on one side is sent from process module 16 to the duplex switch 48 and from there to the duplex loop 50 where the sheet is reversed. The sheet is then again supplied to the process module 16 for printing an image on the second side, and is finally discharged to the paper output module 18 via the duplex switch 48. Thus, the modules 16, 48 and 50 form a closed loop.

The image provider module 14 must in this case provide two images to be printed on the first and the second side of the sheet supplied from the paper input. The timing at least for the second image depends on the timing at which the sheet is returned from the duplex loop 50 to the process module 16.

A possible way to handle this problem is shown in FIG. 10, where the forward messages exchanged between the various modules are indicated by curved arrows. Thus, the allocation procedure starts with an allocate forward message F1 sent from the paper input module 12 to the process module 16. In the embodiment shown in FIGS. 1 and 3, the image provider module 14 was also treated as a module without input, i.e. a module which can independently send an allocate forward message to the process module 16. In FIG. 10 however, the image provider module 14 is treated as a module which receives a virtual input from the process module 16. Thus, although the image provider module 14 does not actually receive an input from the process module, it nevertheless expects a forward message from the process module 16. This allows the image provider module 14 to respond to timing requirements imposed by the process module 16.

In response to the allocate forward message F1 the process module 16 sends a so-called indicate forward message Fi2 to the image provider module 14. This message indicates a time interval in which the process module is ready to receive an image from the image provider module 14. Then, the image provider module 14 sends an allocate forward message F3 to the process module 16 and makes a timing offer consistent with the indicate forward message Fi2. Allocate forward messages F4 and F5 are then passed on from the process module 16 to the duplex switch 48 and from there to the duplex loop 50, and another allocate forward message F6 is sent back to the process module 16. Thereupon, the process module 16 sends another indicate forward message Fi7 to the image provider module 14 in order to indicate a time interval in which the process module 16 will be ready for receiving the second image. The image provider module 14 then issues an allocate forward message F8 to the process module 16 which forwards an allocate forward message F9 to the duplex switch 48, and finally the duplex switch 48 sends an allocate forward message F10 to the paper output module 18. As before, each allocate forward message will be answered by an allocate backward message. A reply to the indicate forward messages Fi2 and Fi7 is not necessary because these messages are implied by the allocate forward messages F3 and F8.

The process shown in FIG. 10 may of course be extended to the scheduling of multi-page jobs where more than two pages are printed on a plurality of duplex sheets.

Typically, the duplex loop 50 of a printer is capable of handling a plurality of sheets at a time. In this case, the number of sheets included in one and the same scheduling process may be roughly equal to the number of sheets that the duplex loop can handle.

As an alternative to the solution shown in FIG. 10, it is possible that the image provider module 14 immediately sends the allocate forward messages F3 and F8 without waiting for any indicate forward messages. Then, the allocate forward message F8 would be stored in the process module 16 until the message F6 is received from the duplex loop 50. However, the procedure shown in FIG. 10 has the advantage that, in particular in more complex systems, the burden on the control unit (not depicted in FIG. 10) of the process module 16 is reduced because the allocate forward messages from the image provider module 14 are received "on demand".

Yet another solution would be that the operation of printing a duplex page is split-up into two separate printing operations, one for each side of the sheet, and a separate scheduling process is triggered by the engine controller 10 for each of these printing processes.

When the chain of interactions between the modules comprises a closed loop, as in a duplex printer, it can, in general, not be taken for granted that the result of the scheduling processes described above will represent an optimum in terms of productivity. If, for example, simplex copies and duplex copies are printed in mixed order, it may happen that the scheduling process leads to a result in which some sheet locations in the duplex loop and/or on the photoconductor belt are left empty, although they could well have been used for simplex copies to be printed.

In view of this problem it may be preferable to specify a plurality of sequences in which the images are sent from the image provider module 14 to the process module 16 and to conduct separate scheduling processes for all these sequences. Then the sequence which has led to the best result, i.e. to the shortest overall time, will be adapted.

Normally, it will of course be required that the printed sheets are discharged by the paper output module 18 in a predetermined order. It will then be the responsibility of the paper output module 18 to check whether this requirement is fulfilled and to reject all scheduling attempts which lead to the wrong order of sheets.

Although only specific embodiments of the invention have been described above, a person skilled in the art will understand that various modifications are possible without departing from the scope of the invention as defined in the appended claims.

What is claimed is:

1. A time scheduling method for a modular engine, said modular engine including a set of action modules for performing a particular action, respectively, wherein, for a chain of actions to be scheduled, interaction between the modules involved in said chain of actions is defined as an output from one module that is delivered as an input to another module, the engine having at least one module that does not need an input from another module for performing a first action, the method allocating a time to each action to be performed by the modules on the basis of information on the current status and timing constraints of the respective modules, the method comprising:

each action module allocating the timings for its own actions by sending a timing offer including a timing range to a recipient module to which said output of the action module has to be delivered; and each module receiving from the corresponding recipient module a message accepting or rejecting the offer, respectively, a message accepting the offer including a specific interaction time selected from the timing range;

wherein the timing offer is based on the internal status and timing constraints of the module sending the timing offer, and if an input from another module is needed, on a timing offer from that other module.

2. The method according to claim 1, wherein a message rejecting a timing offer includes information on timings at which the interaction is not possible, and the action module receiving this messages sends another timing offer on the basis of that information.

3. The method according to claim 1, wherein, when a recipient module rejects a timing offer, all the other modules are instructed to abort the scheduling process and to wait for an instruction concerning a new scheduling attempt.

4. The method according to claim 1, wherein, when a module involved in a particular chain of actions to be scheduled takes an inoperative status for unpredictable time period, all the other modules involved are instructed to abort the scheduling process, and a new scheduling process for said particular chain of actions is started only after the module that has been inoperative sends a signal indicating that it is operative again.

5. The method according to claim 1, wherein all the modules report to an engine controller whether or not the scheduling process has been successful and, in case of success, the modules report the timings that have been allocated to its actions.

6. The method according to claim 1, wherein the modules of an engine and the interactions therebetween define a loop, and wherein a module, at which a first input returned from the loop is combined with a second input entering into the loop from a preceding module, reacts to a timing offer from the module that returns the input from the loop by sending a message to said preceding module, whereupon the preceding module sends a timing offer for the second input.

7. A scheduler system for a modular engine having multiple modules, the scheduler system comprising:
- a plurality of control units respectively associated with the multiple modules,
- each control unit being operable to at least detect or store an internal status and the timing constraints of the associated module and to send a timing offer including a timing range to the control unit of the module to which the input is to be sent,
- wherein each control unit is further operable to check whether a timing offer received from another module is compatible with its own status and timing constraints, and with timing offers received from other modules, and to send a message accepting or rejecting the timing offer back to the other module from which the timing offer has been sent, a message accepting the offer including a specific interaction time selected from the timing range.

8. The scheduler system according to claim 7, wherein the control units are formed by separate processors that are linked together by a bus system.

9. The scheduler system according to claim 7, wherein the modular engine is a modular sheet handling engine.

10. The scheduler system according to claim 9, wherein the multiple modules include an engine controller module, a paper input module, an image provider module, a process module and a paper output module.

11. The scheduler system according to claim 10, wherein the multiple modules include a duplex switch module and a duplex loop module for handling duplex copies.

* * * * *